US011082985B2

(12) United States Patent
Cariou et al.

(10) Patent No.: US 11,082,985 B2
(45) Date of Patent: Aug. 3, 2021

(54) BANDWIDTH AND PRIMARY CHANNEL INDICATION

(71) Applicant: Intel Corporation, Santa Clara, CA (US)

(72) Inventors: Laurent Cariou, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/268,119

(22) Filed: Feb. 5, 2019

(65) Prior Publication Data

US 2020/0008206 A1   Jan. 2, 2020

Related U.S. Application Data

(63) Continuation of application No. 15/391,056, filed on Dec. 27, 2016, now abandoned.

(60) Provisional application No. 62/350,547, filed on Jun. 15, 2016.

(51) Int. Cl.
| *H04W 72/04* | (2009.01) |
| *H04W 72/08* | (2009.01) |
| *H04W 16/14* | (2009.01) |
| *H04W 74/00* | (2009.01) |
| *H04W 84/12* | (2009.01) |
| *H04W 88/02* | (2009.01) |
| *H04W 88/08* | (2009.01) |

(52) U.S. Cl.
CPC .......... *H04W 72/08* (2013.01); *H04W 16/14* (2013.01); *H04W 72/0406* (2013.01); *H04W 72/0453* (2013.01); *H04W 74/002* (2013.01); *H04W 84/12* (2013.01); *H04W 88/02* (2013.01); *H04W 88/08* (2013.01)

(58) Field of Classification Search
None
See application file for complete search history.

(56) References Cited

U.S. PATENT DOCUMENTS

| 9,872,206 | B2* | 1/2018 | Cordeiro | H04W 40/244 |
| 10,187,497 | B1* | 1/2019 | Sun | H04L 69/22 |
| 10,321,487 | B2* | 6/2019 | Sanderovich | H04W 28/02 |
| 2016/0309457 | A1* | 10/2016 | Eitan | H04L 1/0079 |
| 2016/0330738 | A1* | 11/2016 | Eitan | H04L 1/0084 |
| 2017/0332277 | A1* | 11/2017 | Xin | H04L 69/22 |

* cited by examiner

*Primary Examiner* — Willie J Daniel, Jr.
(74) *Attorney, Agent, or Firm* — Eversheds Sutherland (US) LLP

(57) ABSTRACT

This disclosure describes systems, methods, and devices related to bandwidth and primary channel indication. A device may encode an extended directional multi-gigabit (EDMG) field with one or more indications of a primary channel ID, a bandwidth value, or a channel ID for transmission over a wireless communication channel associated with the channel ID. The device may cause the EDMG field to be wirelessly transmitted to a first device over the wireless communication channel.

20 Claims, 8 Drawing Sheets

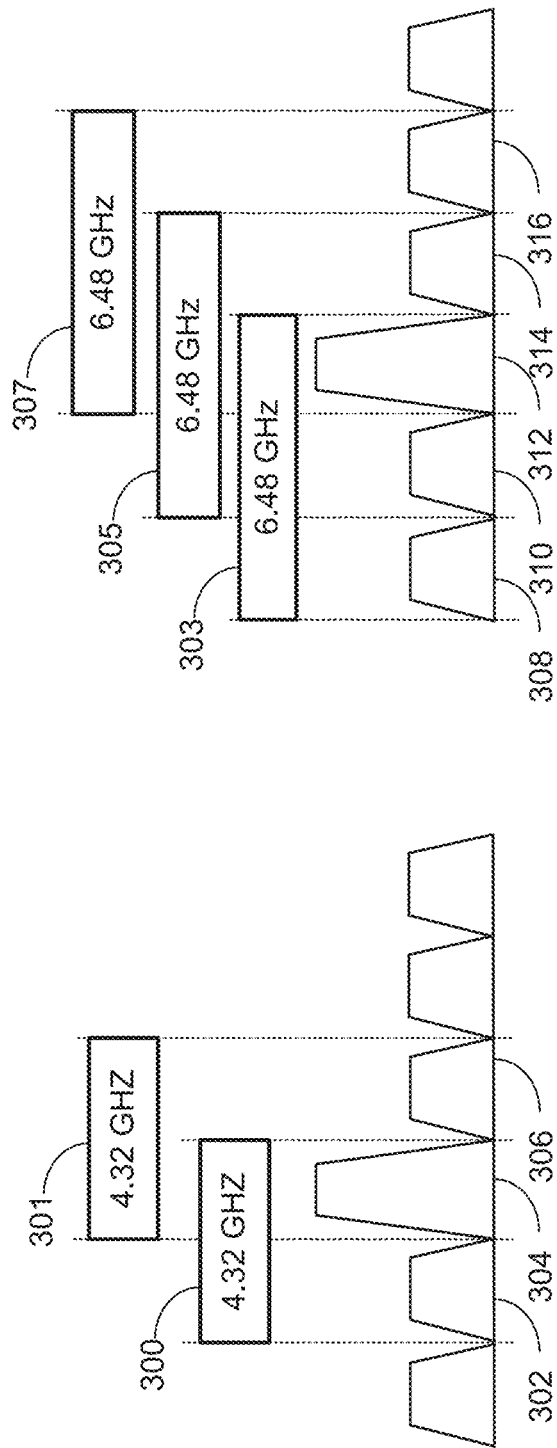

BANDWIDTH AND PRIMARY CHANNEL INDICATION

CROSS-REFERENCE TO RELATED APPLICATIONS

This application is a continuation of U.S. application Ser. No. 15/391,056, filed Dec. 27, 2016, which claims the benefit of U.S. Provisional Application No. 62/350,547 filed Jun. 15, 2016, the disclosures of which are incorporated herein by reference in their entireties.

TECHNICAL FIELD

This disclosure generally relates to systems and methods for wireless communications and, more particularly, to bandwidth and primary channel indication.

BACKGROUND

Wireless devices are becoming widely prevalent and are increasingly requesting access to wireless channels. The growing density of wireless deployments requires increased network and spectrum availability.

BRIEF DESCRIPTION OF THE DRAWINGS

FIG. 3 depicts an illustrative schematic diagram of a bandwidth and primary channel indication system, in accordance with one or more example embodiments of the present disclosure.

DETAILED DESCRIPTION

Figure 1:
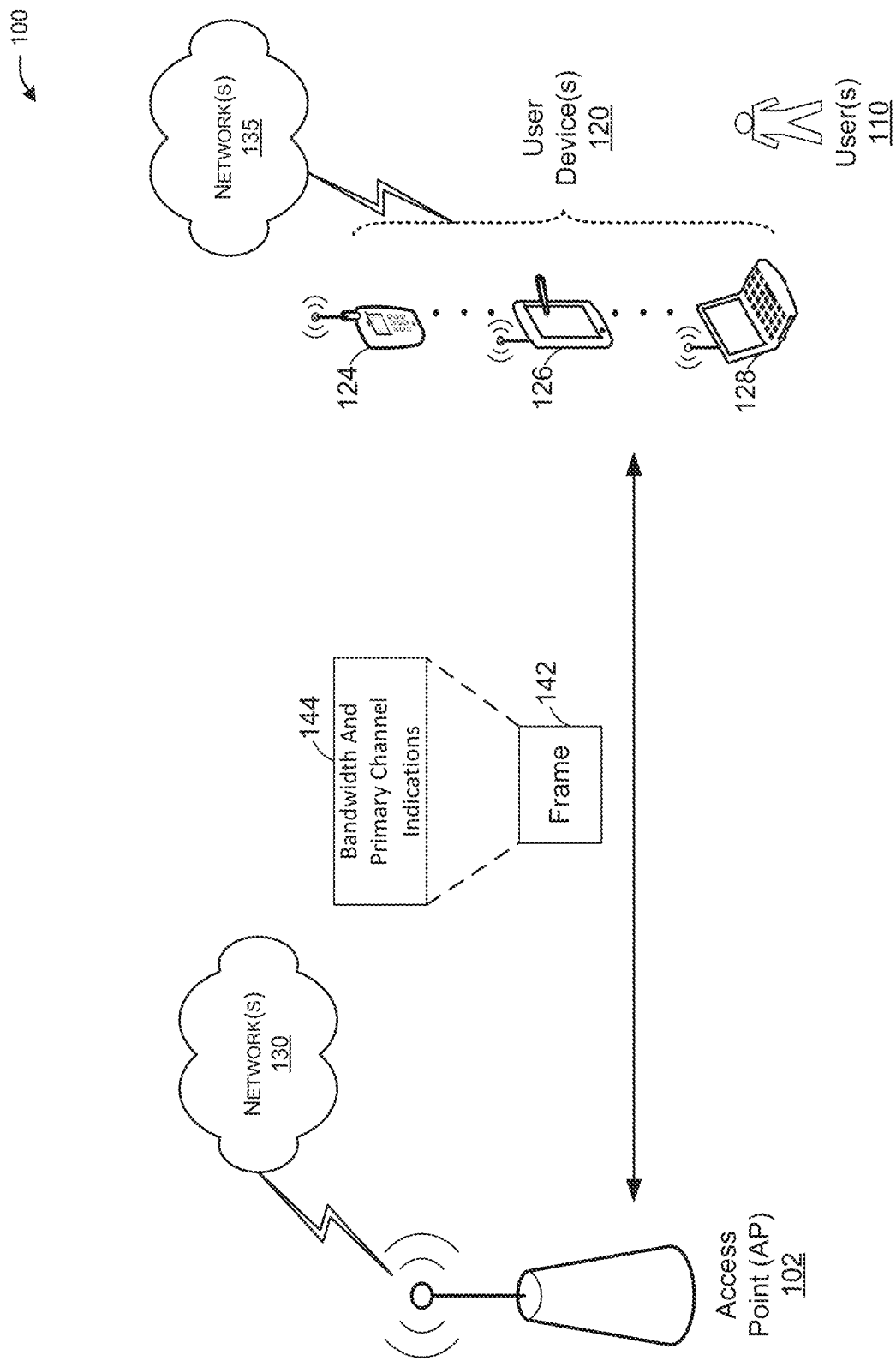
FIG. 1 depicts a network diagram illustrating an example network environment for a bandwidth and primary channel indication system, in accordance with one or more example embodiments of the present disclosure.

Example embodiments described herein provide certain systems, methods, and devices for a bandwidth and primary channel indication system. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or access points (APs) or other devices capable of communicating in accordance with a communication standard, including but not limited to IEEE 802.11ad and/or IEEE 802.11ay. A wireless communication channel may be comprised of a primary channel and a secondary channel. One of the reasons for the notion of primary and secondary channels is that it helps multiple networks to share the same frequency space. The primary channel may be used for devices that only support a certain bandwidth, while the secondary channel may be adjacent to the primary channel and may be aggregated with the primary channel in order to transmit over the specific bandwidth associated with the wireless communication channel. The primary channel forms the core frequency segment that the BSS (basic service set) or AP radio operates on, while the secondary channel(s) may be considered as extensions to the primary channel. For each channel bandwidth, there is one primary channel, meaning that it is the channel used to transmit frames at that channel width. In legacy devices (e.g., IEEE 802.11ad), the primary channel is known to the receiving device since it is always set up to be the first portion of the wireless communication channel. Two devices may simultaneously transmit frames when their primary channels are different.

Example embodiments of the present disclosure relate to systems, methods, and devices for a bandwidth and primary channel indication system.

Directional multi-gigabit (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks in accordance with IEEE 802.11ay.

In an EDMG system, the secondary channel may be either the upper or the lower half of the channel bandwidth associated with the wireless communication channel. Therefore, the primary channel ID may not be known to a receiving device. Further, it is possible to designate a secondary channel as a transmission channel as opposed to legacy devices, which always designate the primary channel with that task. When operating in legacy devices, a wireless LAN will send beacon frames and will announce its existence on its primary channel, but not on its secondary channels. However, in IEEE 802.11ay, it is possible to use the secondary channel to perform functions previously assigned only to the primary channel.

In one embodiment, a bandwidth and primary channel indication system may determine a primary channel, the bandwidth value, and a channel ID used for the transmission of a frame in the physical (PHY) layer. For example, the frame may be any EDMG physical layer convergence protocol data unit (PPDU) that may be sent from a transmitting device (e.g., an access point (AP) or a station device (STA)) to a receiving device (e.g., an AP or an STA). The receiving device may receive the EDMG PPDU and may decode one or more fields included in the EDMG PPDU. The bandwidth and primary channel indication system may include in the frame (e.g., an EDMG PPDU) one or more indications of the bandwidth value (e.g., 2.16 GHz, 4.32 GHz, 6.48 GHz, 8.64 GHz, or 2.16 GHz+2.16 GHz), the channel ID(s) allocated for transmission, and the channel ID on which the primary channel is allocated.

In one embodiment, a bandwidth and primary channel indication system may optimize signaling in order to occupy the least number of bits in order to cover cases where the primary channel is not part of the channels that are modulated by the actual transmission. For example, the bandwidth and primary channel indication system may encode a bandwidth value, the allocated channel ID(s), and the primary channel ID that is inside or outside of the allocated channels, in a reduced number of bits. For example, one or more fields in a frame may be designated as indices to a table having information associated with the used bandwidth, the primary channel ID and the channel ID(s) allocated for transmission.

In one embodiment, the bandwidth and primary channel indication system may encode all the information (e.g., the bandwidth value, the channel ID(s), and the primary channel ID) in a single field, by listing all possible combinations and associating an index value to all combinations.

In another embodiment, the bandwidth and primary channel indication system may encode the bandwidth value and channel ID(s) in one bandwidth field (using an index for all possible combinations), and the primary channel ID in a second field.

In one embodiment, the bandwidth and primary channel indication system may determine an index associated with the one or more indications. The index may be comprised of one or more bits having most the significant bits (MSBs) and the least significant bits (LSBs). The bandwidth ID and the allocated channel ID(s) may be associated with the MSBs, and the LSBs may be used to determine the primary channel ID.

In one embodiment, a bandwidth and primary channel indication system may determine a primary channel ID, the bandwidth value, and the allocated channel ID(s) used for the transmission of a frame to be transmitted in the physical (PHY) layer. For example, the frame may be any EDMG PPDU that may be sent from a transmitting device (e.g., an access point (AP) or a station device (STA)) to a receiving device (e.g., an AP or an STA). The receiving device may receive the EDMG PPDU and may decode one or more fields included in the EDMG PPDU. The bandwidth and primary channel indication system may include in the frame (e.g., an EDMG PPDU) one or more indications of the bandwidth value (e.g., 2.16 GHz, 4.32 GHz, 6.48 GHz, 8.64 GHz, or 2.16 GHz+2.16 GHz), the channel ID(s) allocated for transmission, and the channel ID on which the primary channel is allocated. If one or more indications are included in an EDMG field of a header of the EDMG PPDU, the receiving device may be able to determine the channel on which the EDMG PPDU was sent. In that case, the number of combinations may be reduced by accepting the assumption that this channel is known by the receiving device. Therefore, only the bandwidth value and the channel ID(s) need to be indicated in the one or more indications.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a network diagram illustrating an example network environment for a bandwidth and primary channel indication system, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or the IEEE 802.11ay specifications. The user device(s) 120 may be referred to as stations (STAs). The user device(s) 120 may be mobile devices that are non-stationary and do not have fixed locations.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

In one embodiment, and with reference to FIG. 1, there is shown a general frame format 142 that may contain at least in part one or more indications associated with a bandwidth of a communication channel and/or associated with a primary channel of the communication channel. It is understood that the above descriptions are for purposes of illustration and are not meant to be limiting.

In one embodiment, a bandwidth and primary channel indication system may determine the primary channel and occupied bandwidth from any EDMG PPDU received by a receiving device (e.g., an access point (AP) or a station device (STA)). The bandwidth and primary channel indication system may include bandwidth and primary channel indications 144, either in a single field or in separate fields of the frame 142. For example, the bandwidth and primary channel indications 144 may include at least in part a bandwidth value (e.g., 2.16 GHz, 4.32 GHz, 6.48 GHz, 8.64 GHz, or 2.16 GHz+2.16 GHz), channel IDs allocated for transmission, and a channel ID on which the primary channel is allocated. A receiving device (e.g., the user device(s) 120 and/or the AP 102) may need to determine information associated with the bandwidth and the primary channel before being able to transmit data. For example, a transmitting device (e.g., the user device(s) 120 and/or the AP 102) may encode information in the frame 142 and may send the frame 142 to a receiving device (e.g., the user device(s) 120 and/or the AP 102). The receiving device may decode the frame 142 and may identify information associated with the bandwidth used and the location of the primary channel. The information may be in the form of one or more indices that may be referencing a table stored on a storage device accessible by the receiving device. The table may include the bandwidth used, the channel IDs allocated for transmission, and the channel ID allocated as a primary channel. The receiving device may index the table using one of the one or more indices extracted or otherwise decoded from the received frame 142. The receiving device may retrieve the information that was indexed by the one or more indices. The information may allow the receiving device to determine the bandwidth used, the channel IDs allocated for transmission, and the channel ID on which the primary channel is allocated. This information may assist the receiving device when transmitting signals back to the transmitting device. The bit size of the one or more indices may depend on the number of combinations of possible bandwidth values, channel IDs, and primary channel IDs needed to be conveyed to the receiving device. It is understood that the above descriptions are for purposes of illustration and are not meant to be limiting.

Figure 2A:
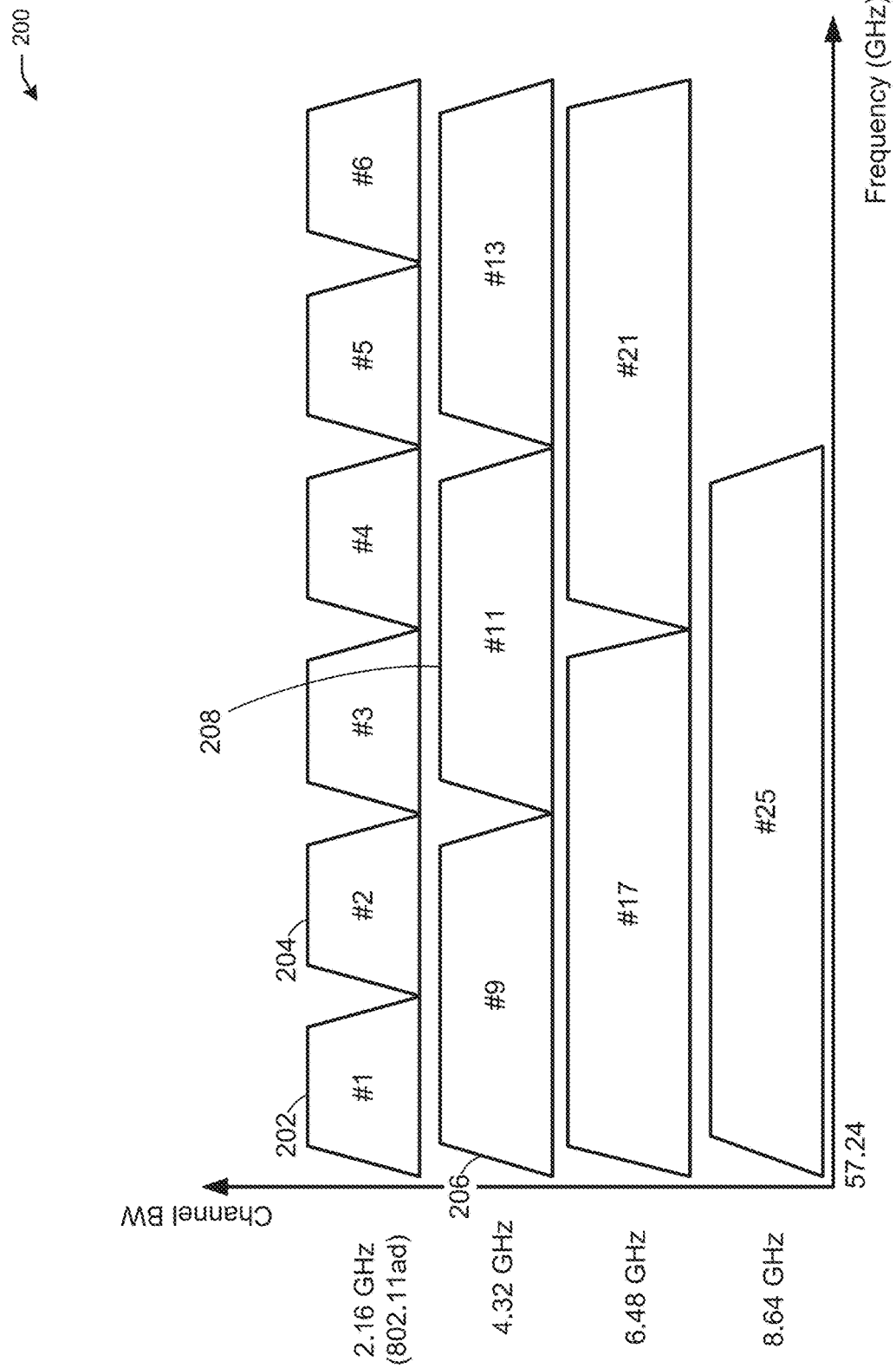
FIG. 2A depicts an illustrative schematic diagram of a bandwidth and primary channel indication system, in accordance with one or more example embodiments of the present disclosure.

FIG. 2A depicts an illustrative schematic diagram of a bandwidth and primary channel indication system 200, in accordance with one or more example embodiments of the present disclosure.

Referring to FIG. 2A, the bandwidth and primary channel indication system may facilitate encoding information (e.g., bandwidth, all channel IDs, primary channel ID) in a single field of a PPDU to be transmitted from a transmitting device to a receiving device. The single field may be an index indicating the various combinations of the bandwidth used, the channel IDs allocated for transmission, and the channel ID on which the primary channel is allocated. The index may have a length of one or more bits based at least in part on the number of possible combinations that it is relaying. In order to determine the number of bits needed to encode the number of possible combinations, the index may have a length of N bits, where N is a positive integer indicating the number of bits needed to cover the possible combinations of $2^N$. For example, in order to convey 100 possible combinations, 7 bits may be needed because the 7 bits would account for $2^7=128$ possible combinations.

In one embodiment, the bandwidth and primary channel indication system may define an indexing solution to identify each bandwidth combination (e.g., 2.16 GHz, 4.32 GHz, 6.48 GHz, 8.64 GHz, 2.16 GHz+2.16 GHz, etc.) with each allocation of the in-band primary/secondary channels, as well as each possible allocation of the out-band primary channels.

In one embodiment, the bandwidth and primary channel indication system may include various options for the ID of the primary channel. For example, a 4.32 GHz channel (e.g., channel 206) may be an aggregation of two 2.16 GHz adjacent channels (e.g., channel 202 and channel 204). The bandwidth and primary channel indication system may facilitate transmissions on the full 4.32 GHz band (e.g., channel 206) with the primary channel sitting on either channel 202 or channel 204. The bandwidth and primary channel indication system may encode one or more fields with one or more of a frame to notify a receiving device where the primary channel is and how large the bandwidth is. The one or more fields may include one or more indices associated with a table stored on a storage device.

In one embodiment, the bandwidth and primary channel indication system may characterize an in-band primary channel as a channel allocated to be a primary channel within an original channel. For example, if channel 206 is used, where the channel 206 is made up of an aggregation of channel 202 and channel 204, selecting the primary channel within the channel 206 may be designated as an in-band primary channel. However, if the primary channel is allocated in channel 208, the primary channel may be designated as an out-band primary channel.

In one embodiment, it may be possible to have a 2.16 GHz transmission on the secondary channel only. In such case, the transmission must signal in the header of a frame, the bandwidth (e.g., 2.16 GHz), the channel ID (e.g., channel 202 or channel tool) allocated for transmission, and where the primary channel is. The primary channel may be allocated in another channel than the channel ID of the actual transmission. The bandwidth and primary channel indication system may characterize these modes, where the primary channel is allocated to another channel by an out-band primary channel.

Assuming a scenario with six channels of 2.16 GHz, the number of possible bandwidth combinations may be counted, including all possible modes with the in-band primary channel or with the out-band primary channel.

For example, if only 2.16 GHz bandwidths are utilized, then there will be six combinations that may need to be related to a receiving device. For example, if a transmitting device allocates one of the six channels (e.g., channels #1, #2, #3, #4, #5, and #6) as a primary channel, then there are six possibilities for where the primary channel may be.

In the case of 4.32 GHz, there may be three bandwidth values that may be available (e.g., channel #9, #11, or #13). It should be understood that each of channel #9, #11, and #13 may be an aggregation of two 2.16 GHz channels. For example, channel #9 may be an aggregation of channel #1 and channel #2. Channel #11 may be an aggregation of channel #3 and channel #4. Channel #13 may be an aggregation of channel #5 and channel #6. Therefore, within each of the 4.32 GHz channels, there may be two options for where the in-band primary channel may be, and for where the out-band primary channel may be. For example, within channel #9, the in-band primary channel may be either in the first half (e.g., channel #1) of the channel #9 or the second half (e.g., channel #2) of the channel #9. Also in that case, the primary channel may be in one of the halves within channel #11 and channel #13, which means four possible locations of an out-band primary channel. Therefore, a total of three bandwidth combinations multiplied by two possible in-band primary channel locations and four possible out-band primary channel locations is equal to 18 possible combinations. These 18 possible combinations may need to be relayed to the receiving device.

In the case of 6.48 GHz, there may be two possible bandwidth values (e.g., channel #17 and channel #21). Each of channel #17 and channel #21 is an aggregation of three 2.16 GHz channels. For example, channel #17 is an aggregation of channel #1, channel #2, and channel #3. Similarly, channel #21 is an aggregation of channel #4, channel #5, and channel #6. Therefore, there may be three in-band primary channel locations and three 2.16 GHz out-band primary channel locations. Therefore, a total of two bandwidth possibilities multiplied by six possibilities of primary channel locations is equal to 12 possible combinations.

In the case of 8.64 GHz, there may be one possible bandwidth option (e.g., channel #25). It should be understood that channel #25 is an aggregation of four 2.16 GHz channels (e.g., channel #1, channel #2, channel #3, and channel #4). Therefore, there may be four in-band primary channel locations within channel #25 plus two more 2.16 GHz out-band primary channel locations (e.g., channel #5 and channel #6). Therefore, a total of one bandwidth possibility multiplied by six possibilities of primary channel locations is equal to six possible combinations.

In the case of 2.16 GHz+2.16 GHz, there may be 15 bandwidth combinations, two in-band primary channels, and four out-band channels. That is, 15 multiplied by six, totals 90 possible combinations. Therefore, by having six available channels, a total of 132 possible bandwidth options may be available such that a transmitting device may need to indicate these possibilities to a receiving device based on all of these possible options. Therefore, an index of eight bits may be needed in order to relay that information (e.g., $2^8=256$ indices), where each index will relay the bandwidth, the channel ID(s) allocated for transmission, and the primary channel ID.

In one embodiment, the bandwidth and primary channel indication system may facilitate multiple indexing solutions. The most straightforward solution is to list the combinations by bandwidth, and to define an incremental index per bandwidth, assuming that, for each bandwidth, an offset may be defined such that: (1) the entries of different bandwidths do not overlap; and (2) sufficient entries exist per bandwidth to accommodate new channels in the future.

In another embodiment, the bandwidth and primary channel indication system may facilitate a hierarchal allocation of indexes so that the first most significant bits (MSBs) may determine the bandwidth value, and the least significant bits (LSBs) may determine the primary channel ID and the channel ID allocated for transmission or vice versa. It should be understood that the above descriptions are for purposes of illustration and that other encoding of information within one or more fields may be possible.

In another embodiment, the bandwidth and primary channel indication system may encode the bandwidth and channel ID(s) allocated for transmission in a first field (using an index for all possible combinations), and the primary channel ID in a second field.

The bandwidth and primary channel indication system may define an indexing solution to include in the first field all possible bandwidth combinations: (1) per bandwidth (2.16 GHz, 4.32 GHz, 6.48 GHz, 8.64 GHz, 2.16 GHz+2.16 GHz); and (2) all the possible allocations of channel IDs. In the example with six channels, and non-overlapping channel bonding solutions, the following combinations may be possible: (1) 2.16 GHz: six combinations; (2) 4.32 GHz: three combinations; (3) 6.48 GHz: two combinations; (4) 8.64 GHz: one combination; and (5) 2.16 GHz+2.16 GHz: 15 combinations. This means that there are 27 combinations that may be encoded in 5 bits. Therefore, an index of 5 bits may be utilized in order to relay all possible 27 combinations to a receiving device.

In one embodiment, the bandwidth and primary channel indication system may define a field for the primary channel, which may be in any of the six channels (e.g., channels #1, #2, #3, #4, #5, and #6). The bandwidth and primary channel indication system may facilitate indexing for the six possibilities and therefore, for example, using 3 bits for the primary channel field. Consequently, the primary channel may be in any of the six available channels and therefore a bandwidth (BW) field of 5 bits and a primary channel field of 3 bits may be used, in order to cover all combinations in a very simple way.

Figure 2B:
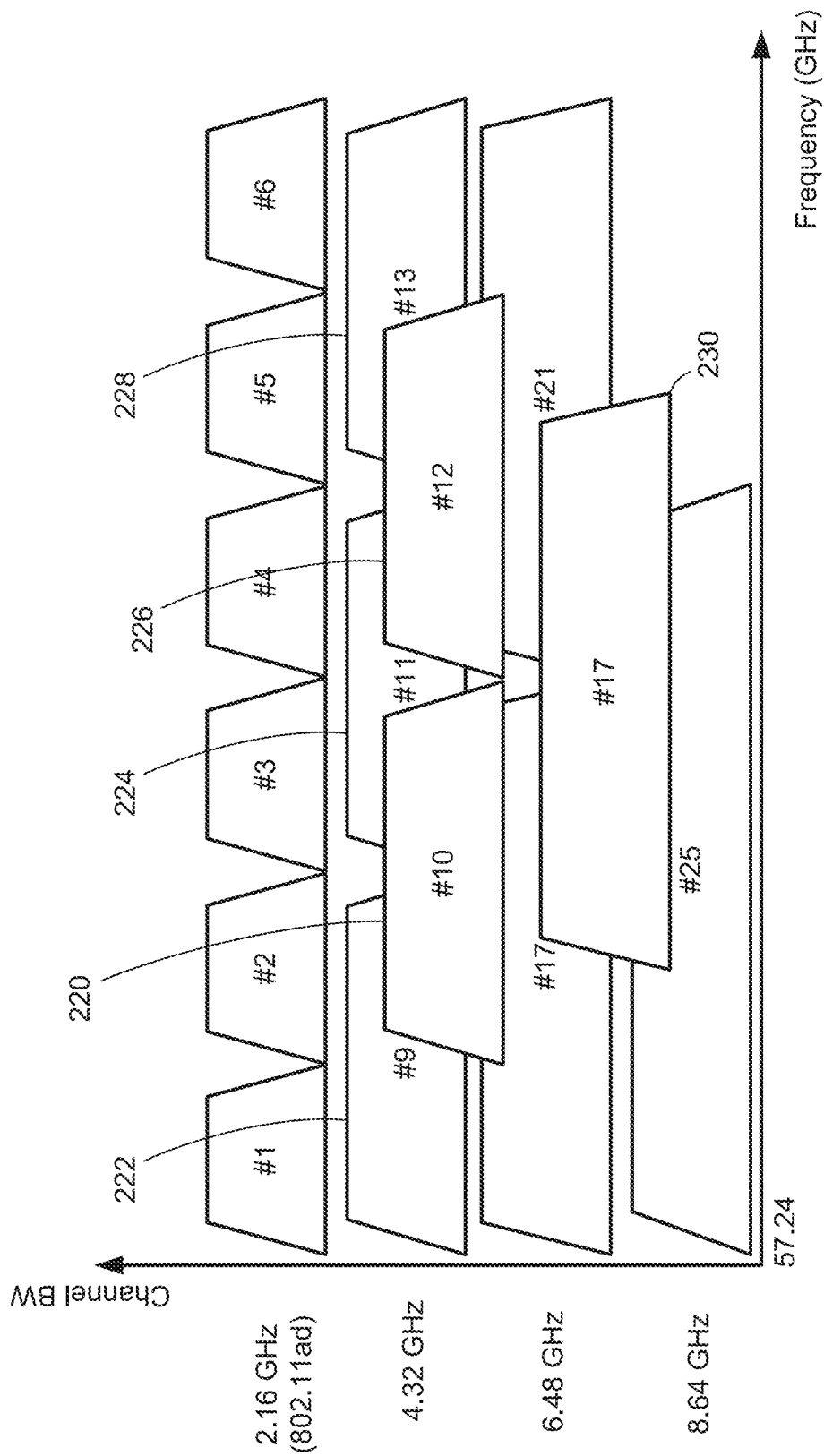
FIG. 2B depicts an illustrative schematic diagram of a bandwidth and primary channel indication system, in accordance with one or more example embodiments of the present disclosure.

FIG. 2B depicts an illustrative schematic diagram of a bandwidth and primary channel indication system 250, in accordance with one or more example embodiments of the present disclosure.

Referring to FIG. 2B, the bandwidth and primary channel indication system may facilitate adaptation for overlapping channels (e.g., channels 220, 226, and 230). It should be understood that the above descriptions of FIG. 2A may be extended if overlapping bonded channels are defined. For example, between channels 222 and 224, there may exist an overlapping 4.32 GHz channel (e.g., channel 220). In that case, additional combinations of bandwidth value, channel ID(s) allocated transmission, and primary channel ID may be envisioned in order to account for the additional channels that may be indicated by a transmitting device. Consequently, the bandwidth and primary channel indication system may be configured to account for overlapping channels such as a PPDU frame transmitted from the transmitting device to a receiving device and may include one or more indications for overlapping and non-overlapping channels including information such as the bandwidth used, the channel IDs allocated for transmissions, and the channel ID on which the primary channels are allocated. It should be appreciated that the overlapping channels scenario will increase the number of indices used because more combinations and options will be available due to the additional channels. Similarly, channel 226 may overlap channels 224 and 228.

It should be noted that a difference with the embodiments of FIG. 2A may be the additional number of combinations that may exist for 4.32, 6.48, and 8.64 GHz. This may affect the number of bits needed to convey all possibilities. For instance, by using six channels (e.g., channels #1, #2, #3, #4, #5, and #6), there may be six possible combinations for 2.16 GHz, five possible combinations with 4.32 GHz (e.g., channels 222, 220, 224, 226, and 228), four combinations for 6.48 GHz, three combinations for 8.64 GHz and 15 combinations for 2.16 GHz+2.16 GHz. That is, there are 33 combinations that may be encoded in 6 bits. It is understood that the above descriptions are for purposes of illustration and are not meant to be limiting.

FIG. 3 depicts an illustrative schematic diagram of a bandwidth and primary channel indication system 300, in accordance with one or more example embodiments of the present disclosure.

In one embodiment, the bandwidth and primary channel indication system may facilitate optimization of the embodiments of FIGS. 2A and 2B if the current channel is known by the receiving device. That is, the receiving device would need a subset of the information relayed to it by the transmitting device in the fields of a frame. In one embodiment, if the field(s) is a header of a PPDU, the receiving device may determine at least the 2.16 GHz channel on which the PHY convergence protocol data unit (PPDU) is sent. Therefore, this may reduce the number of combinations by having the assumption that this channel is known by the receiving device.

In the case where there is a first field used for bandwidth and channel IDs allocated for transmissions and a second field used for the primary channel ID indication described in FIG. 2A, the receiving device may not need the second field since the primary channel may be already known to it. Therefore, only the first field may need to be signaled to the receiving device. For example, for 2.16 GHz PPDU frames, it may be signaled that it is a 2.16 GHz PPDU (one combination in the 2.16 GHz category).

For 4.32 GHz PPDUs, there may be two possible aggregations of two 2.16 GHz channels. For example, one possibility may be over channel 300, which may include an aggregation of channels 302 and 304 and another possibility may be over channel 301, which may include an aggregation of channels 304 and 306. It may be signaled that it is a 4.32 GHz channel and the other bonded 2.16 GHz channel is an upper channel (e.g., channel 306) or a lower channel (e.g., channel 302), that is, two combinations. For 6.48 GHz PPDUs, there may be three possible aggregations of three 2.16 GHz channels to make up 6.48 GHz. For example, one possibility may be over channel 303, which may include an aggregation of channels 308, 310, and 312. Another possibility may be over channel 305, which may be an aggregation of channels 310, 12, and 314, and another possibility may be over channel 307, which may be an aggregation of channels 312, 314, and 316. That is, a transmitting device may signal to a receiving device that the channel used is a 6.48 GHz channel and that the two other bonded channels are both upper or both lower channels, or one lower and one upper channel, that is three combinations. Similarly, for 8.64 GHz PPDUs, it may be signaled that it is an 8.64 GHz channel and that the three other bonded channels are in all four possible upper/lower channels (four combinations). Similarly, for 2.16 GHz+2.16 GHz PPDUs, it may be signaled that the other 2.16 GHz channel, which can be in the other five channels, hence, five combinations). For overlapping channels, only 15 combinations exist, and the first field may be encoded in only 4 bits.

It should be noted that although six channels are depicted in FIG. 2A, and FIG. 2B, additional channels may be envisioned. For example, instead of six channels, there may be seven channels. In that case, the combinations to relay the above information may be increased requiring an additional number of bits to be sent to a receiving device.

It is understood that the above descriptions are for purposes of illustration and are not meant to be limiting.

Figure 4A:
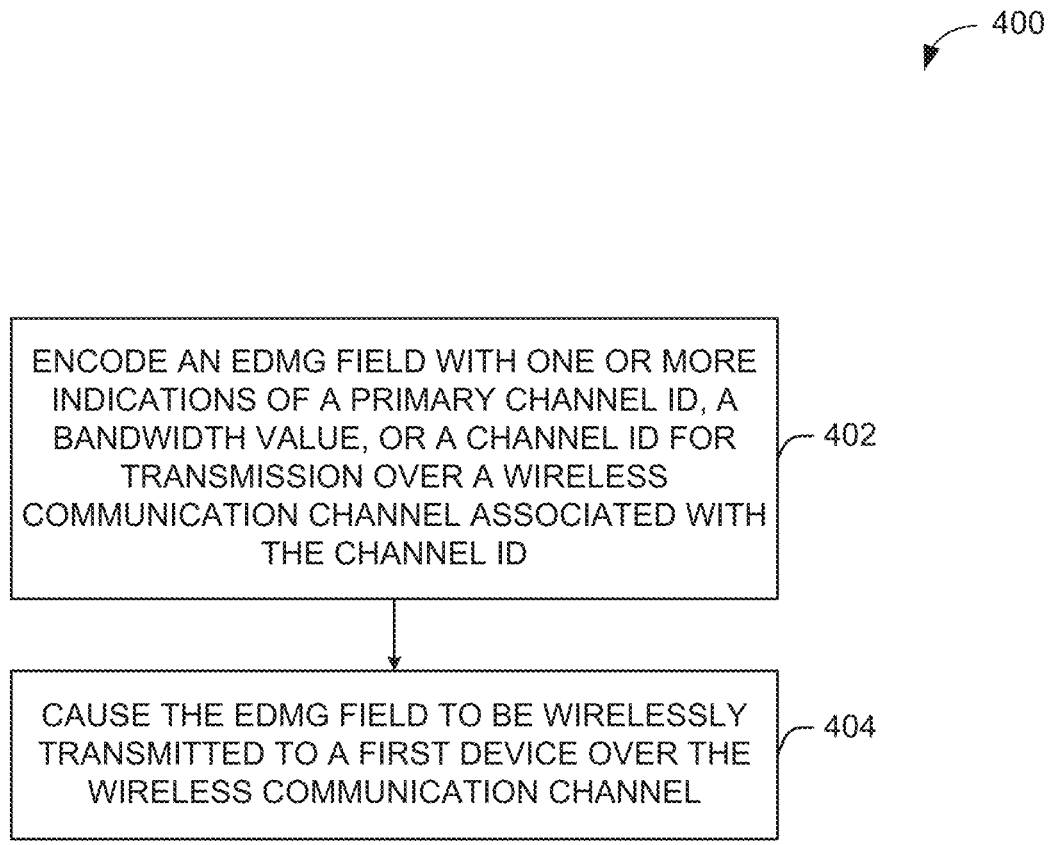
FIG. 4A depicts a flow diagram of an illustrative process for a bandwidth and primary channel indication system, in accordance with one or more example embodiments of the present disclosure.

FIG. 4A illustrates a flow diagram of an illustrative process 400 for an illustrative bandwidth and primary channel indication system, in accordance with one or more example embodiments of the present disclosure.

At block 402, a transmitting device (e.g., the user device(s) 120 and/or the AP 102 of FIG. 1) may encode an EDMG field with one or more indications of a primary channel ID, a bandwidth value, and/or a channel ID for transmission over a wireless communication channel associated with the channel ID. In an EDMG system, the secondary channel may be either the upper or lower half of the channel bandwidth associated with the wireless communication channel. Therefore, the primary channel ID may not be known to a receiving device. Further, it is possible to designate a secondary channel as a transmission channel as opposed to legacy devices, which always designate the primary channel with that task. When operating in legacy devices, a wireless LAN will send beacon frames and announce its existence on its primary channel, but not on its secondary channels. However, in IEEE 802.11ay, it is possible to use the secondary channel to perform functions previously assigned only to the primary channel. The transmitting device may determine the primary channel, the bandwidth value, and a channel ID used for the transmission of a frame in the PHY layer. For example, the frame may be any EDMG PPDU that may be sent from the transmitting device to a receiving device (e.g., the user device(s) 120 and/or the AP 102 of FIG. 1). The transmitting device may encode a bandwidth value, the allocated channel ID(s), and the primary channel ID that is inside or outside of the allocated channels in a reduced number of bits. For example, one or more fields in a frame may be designated as indices to a table having information associated with the used bandwidth, the primary channel ID and the channel ID(s) allocated for transmission. An index field may be an index indicating the various combinations of the bandwidth used, the channel IDs allocated for transmission, and the channel ID on which the primary channel is allocated. The index may have a length of one or more bits based at least in part on the number of possible combinations that it is relaying. In order to determine the number of bits needed to encode the number of possible combinations, index may have a length of N bits, where N is a positive integer indicating the number of bits needed to cover the possible combinations of $2^N$. For example, in order to convey 100 possible combinations, 7 bits may be needed because the 7 bits would account for $2^7=128$ possible combinations.

At block 404, the device may cause the EDMG field to be wirelessly transmitted to a first receiving device (e.g., the user device(s) 120 and/or the AP 102 of FIG. 1) over the wireless communication channel. For example, the AP 102 may include an index in the EDMG field to indicate to the receiving device the combination of the bandwidth used, the channel IDs allocated for transmission, and the channel ID on which the primary channel is allocated. The AP 102 would then send the EDMG field that may be included in an EDMG frame. The receiving device may retrieve the information that was indexed by the one or more indices. The information may allow the receiving device to determine the bandwidth used, the channel IDs allocated for transmission, and the channel ID on which the primary channel is allocated. It is understood that the above descriptions are for purposes of illustration and are not meant to be limiting.

Figure 4B:
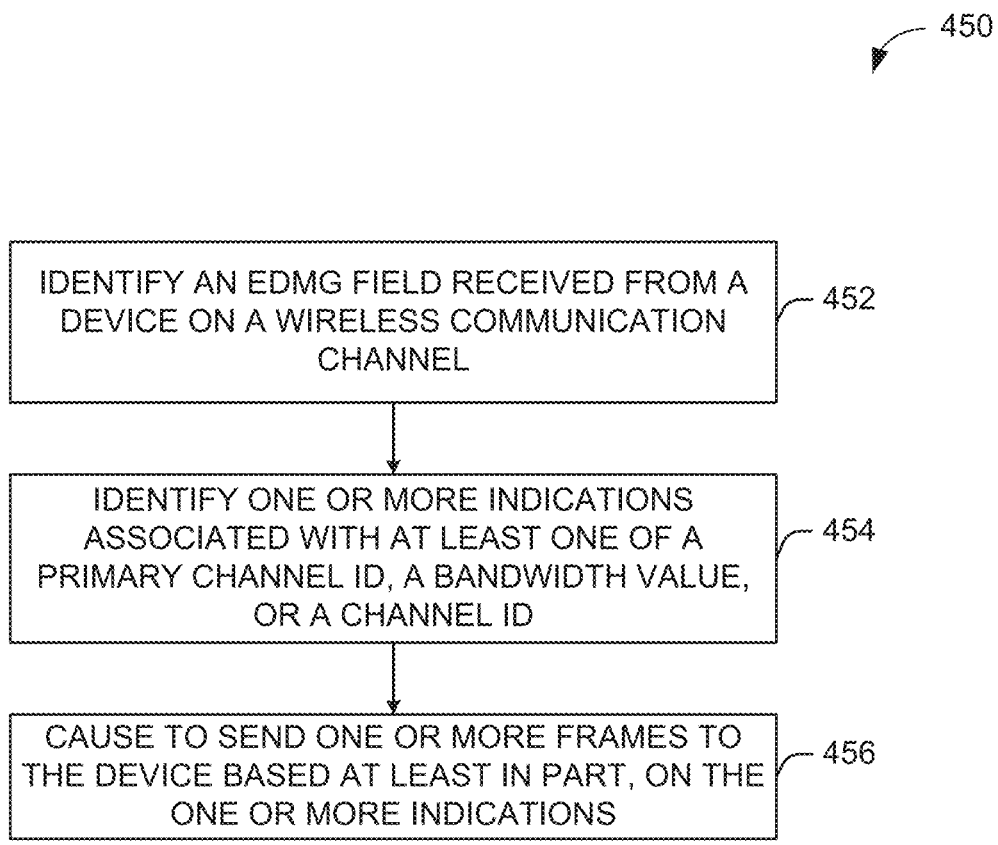
FIG. 4B depicts a flow diagram of an illustrative process for a bandwidth and primary channel indication system, in accordance with one or more example embodiments of the present disclosure.

FIG. 4B illustrates a flow diagram of an illustrative process 450 for an illustrative bandwidth and primary channel indication system, in accordance with one or more example embodiments of the present disclosure.

At block 452, a receiving device (e.g., the user device(s) 120 and/or the AP 102 of FIG. 1) may identify an EDMG field received from a transmitting device (e.g., the user device(s) 120 and/or the AP 102 of FIG. 1) on a wireless communication channel. For example, the AP 102 may have sent an EDMG frame (e.g., an EDMG PPDU) to a user device 120. The EDMG frame may have included information that may assist the receiving device in determining information associated with the primary channel used, the bandwidth used, and/or the channel ID(s) allocated for transmission.

At block 454, the receiving device may identify one or more indications associated with at least one of a primary channel ID, a bandwidth value, or a channel ID.

At block 456, the device may cause to send one or more frames to the device based at least in part on the one or more indications. For example, one or more indications of the bandwidth value (e.g., 2.16 GHz, 4.32 GHz, 6.48 GHz, 8.64 GHz, or 2.16 GHz+2.16 GHz), the channel ID(s) allocated for transmission, and the channel ID on which the primary channel is allocated. The one or more indications may be included in an EDMG field that may include one or more indices. For example, the one or more indices may reference a table stored on a storage device accessible by the receiving device. The table may include the bandwidth used, the channel IDs allocated for transmission, and the channel ID allocated as a primary channel. The receiving device may index the table using one of the one or more indices extracted or otherwise decoded from the received EDMG frame. The receiving device may retrieve the information that was indexed by the one or more indices. The information may allow the receiving device to determine the bandwidth used, the channel IDs allocated for transmission, and the channel ID on which the primary channel is allocated. This information may assist the receiving device when transmitting signals back to the transmitting device. The bit size of the one or more indices may depend on the number of combinations of possible bandwidth values, channel IDs, and primary channel IDs needed to be conveyed to the receiving device. It is understood that the above descriptions are for purposes of illustration and are not meant to be limiting.

Figure 5:
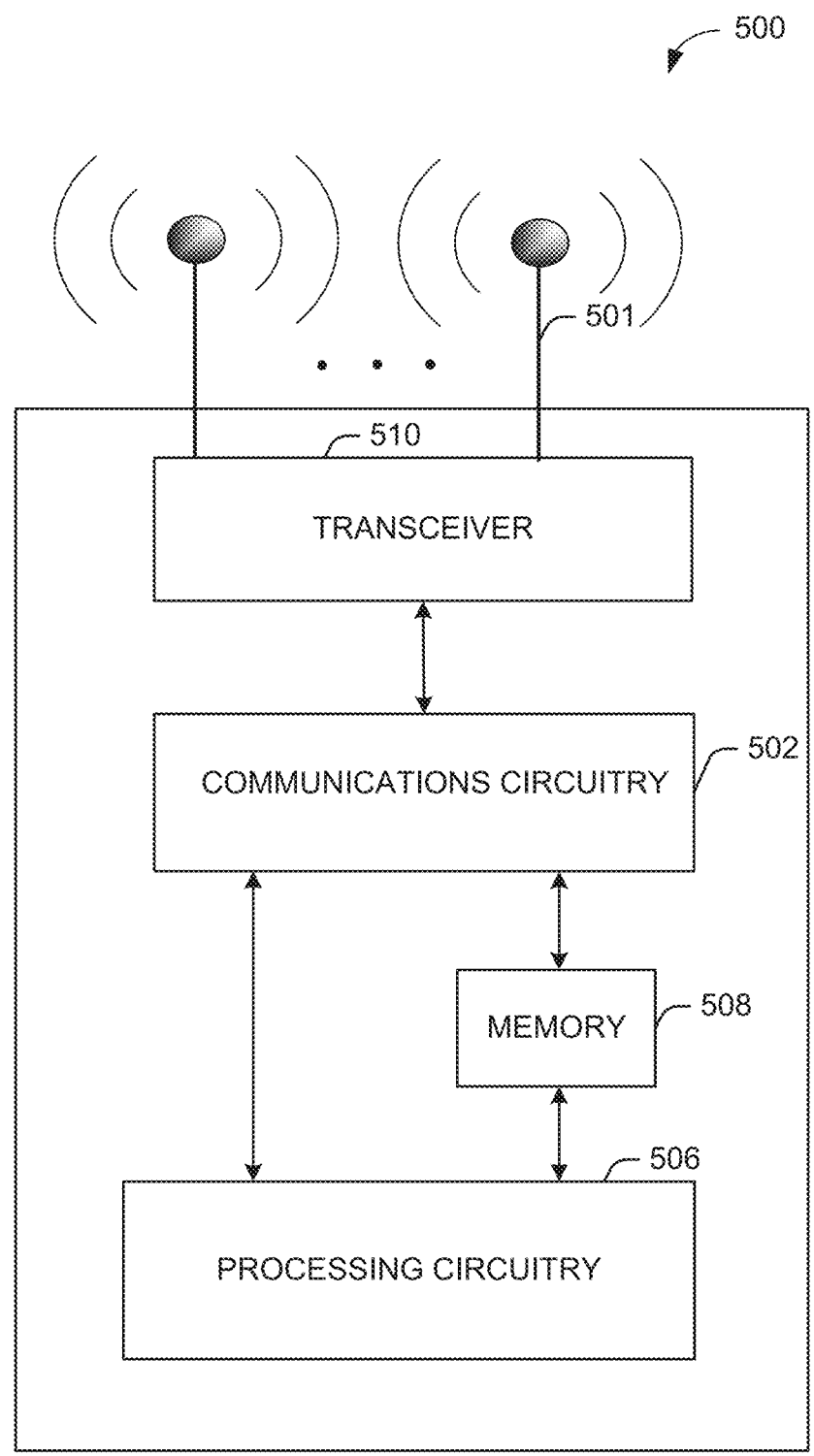
FIG. 5 illustrates a functional diagram of an example communication station that may be suitable for use as a user device, in accordance with one or more example embodiments of the present disclosure.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1, 2A, 2B, 3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
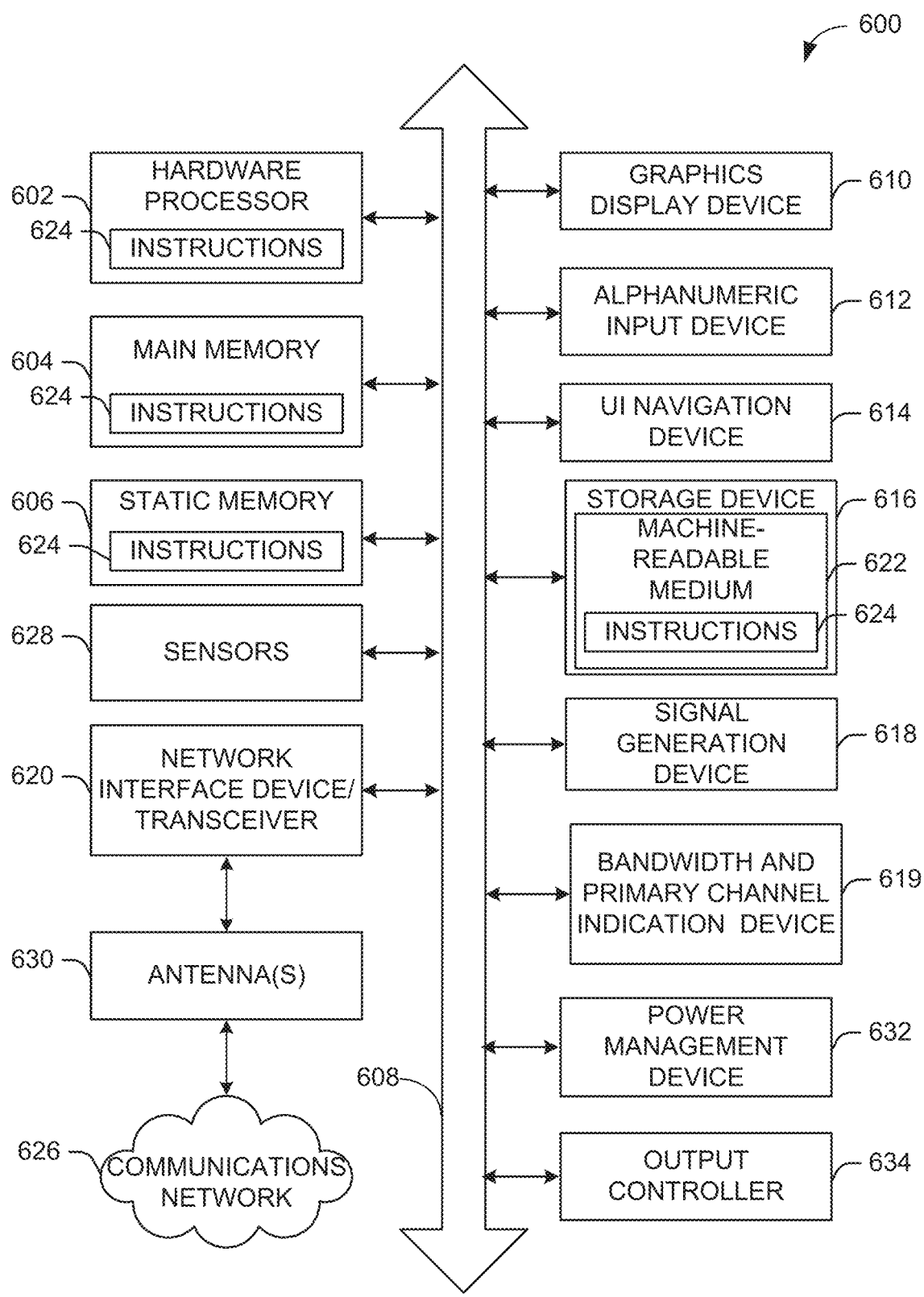
FIG. 6 is a block diagram of an example machine upon which any of one or more techniques (e.g., methods) may be performed, in accordance with one or more example embodiments of the present disclosure.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a bandwidth and primary channel indication device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The bandwidth and primary channel indication device 619 may carry out or perform any of the operations and processes (e.g., processes 400 and 450) described and shown above. For example, the bandwidth and primary channel indication device 619 may be configured to determine a primary channel, the bandwidth value, and a channel ID used for the transmission of a frame to be transmitted in the physical (PHY) layer. For example, the frame may be any EDMG PPDU that may be sent from a transmitting device (e.g., an access point (AP) or a station device (STA)) to a receiving device (e.g., an AP or an STA). The receiving device may receive the EDMG PPDU and may decode one or more fields included in the EDMG PPDU. The bandwidth and primary channel indication device 619 may include in the frame (e.g., an EDMG PPDU) one or more indications of the bandwidth value (e.g., 2.16 GHz, 4.32 GHz, 6.48 GHz, 8.64 GHz, or 2.16 GHz+2.16 GHz), the channel ID(s) allocated for transmission, and the channel ID on which the primary channel is allocated.

The bandwidth and primary channel indication device 619 may optimize signaling in order to occupy the least number of bits in order to cover cases where the primary channel is not part of the channels that are modulated by the actual transmission. For example, the bandwidth and primary channel indication device 619 may encode a bandwidth value, the allocated channel ID(s), and the primary channel ID that is inside or outside of the allocated channels in a reduced number of bits.

The bandwidth and primary channel indication device 619 may encode all the information (e.g., the bandwidth value, the channel ID(s), and the primary channel ID) in a single field, by listing all possible combinations and associating an index value with all combinations.

The bandwidth and primary channel indication device 619 may encode the bandwidth value and the channel ID(s) in one bandwidth field (using an index for all possible combinations), and the primary channel ID in a second field.

The bandwidth and primary channel indication device 619 may determine an index associated with the one or more indications. The index may be comprised of one or more bits having the most significant bits (MSBs) and the least significant bits (LSBs). The bandwidth ID and the allocated channel ID(s) may be associated with the MSBs, and the LSBs may be used to determine the primary channel ID.

The bandwidth and primary channel indication device 619 may determine a primary channel ID, the bandwidth value, and the allocated channel ID(s) used for the transmission of a frame to be transmitted in the physical (PHY) layer. For example, the frame may be any EDMG PPDU that may be sent from a transmitting device (e.g., an access point (AP) or a station device (STA)) to a receiving device (e.g., an AP or an STA). The receiving device may receive the EDMG PPDU and may decode one or more fields included in the EDMG PPDU. The bandwidth and primary channel indication device 619 may include in the frame (e.g., an EDMG PPDU) one or more indications of the bandwidth value (e.g., 2.16 GHz, 4.32 GHz, 6.48 GHz, 8.64 GHz, or 2.16 GHz+2.16 GHz), the channel ID(s) allocated for transmission, and the channel ID on which the primary channel is allocated. If the one or more indications are included in an EDMG field of a header of the EDMG PPDU, the receiving device may be able to determine the channel on which the EDMG PPDU was sent. In that case, the number of combinations may be reduced by accepting the assumption that this channel is known by the receiving device. Therefore, only the bandwidth value and the channel ID(s) need to be indicated in the one or more indications.

It is understood that the above are only a subset of what the bandwidth and primary channel indication device 619 may be configured to perform and that other functions included throughout this disclosure may also be performed by the bandwidth and primary channel indication device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to encode an extended directional multi-gigabit (EDMG) field with one or more indications of a primary channel ID, a bandwidth value, or a channel ID for transmission over a wireless communication channel associated with the channel ID. The memory and processing circuitry may be further configured to cause the EDMG field to be wirelessly transmitted to a first device over the wireless communication channel.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. The each one of the one or more indications is an index to an entry in a table, wherein the table may include one or more combinations of a primary channel ID, a bandwidth value, or a channel ID. The index is comprised of one or more bits having most significant bits (MSBs) and least significant bits (LSBs), wherein the MSBs are associated with the bandwidth value, and wherein the LSBs are associated with the primary channel ID and the channel ID. The memory and the processing circuitry may be further configured to determine whether the one or more indications include a first index and a second index, wherein the first index is associated with the bandwidth value and the channel ID, and the second index is associated with the primary channel ID. The memory and the processing circuitry may be further configured to determine that the EDMG field is associated with an EDMG physical layer convergence protocol data unit (PPDU). The memory and processing circuitry may be further configured to associate the one or more indications with the bandwidth value and the channel ID. The primary channel ID is associated with at least one of an in-band primary channel or an out-band primary channel. The device may further include a transceiver configured to transmit and receive wireless signals. The device may further include one or more antennas coupled to the transceiver.

According to example embodiments of the disclosure, there may be a device. The device may include memory and processing circuitry configured to identify an extended directional multi-gigabit (EDMG) field received from a device on a wireless communication channel. The memory and processing circuitry may be further configured to identify one or more indications associated with at least one of a primary channel ID, a bandwidth value, or a channel ID. The memory and processing circuitry may be further configured to cause to send one or more frames to the device based at least in part on the one or more indications.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table may include one or more combinations of a primary channel ID, a bandwidth value, or a channel ID. The index is comprised of one or more bits having most significant bits (MSBs) and least significant bits (LSBs).

According to example embodiments of the disclosure, there may be a non-transitory computer-readable medium storing computer-executable instructions which, when executed by a processor, cause the processor to perform operations. The operations may include identifying an extended directional multi-gigabit (EDMG) field received from a device on a wireless communication channel. The operations may include identifying one or more indications associated with at least one of a primary channel ID, a bandwidth value, or a channel ID. The operations may include causing to send one or more frames to the device based at least in part on the one or more indications.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table may include one or more combinations of a primary channel ID, a bandwidth value, or a channel ID. The index is comprised of one or more bits having most significant bits (MSBs) and least significant bits (LSBs).

According to example embodiments of the disclosure, there may be a non-transitory computer-readable medium storing computer-executable instructions which, when executed by a processor, cause the processor to perform operations. The operations may include encoding, by one or more processors, an extended directional multi-gigabit (EDMG) field with one or more indications of a primary channel ID, a bandwidth value, or a channel ID for transmission over a wireless communication channel associated with the channel ID. The operations may include causing the EDMG field to be wirelessly transmitted to a first device over the wireless communication channel.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table may include one or more combinations of a primary channel ID, a bandwidth value, or a channel ID. The index is comprised of one or more bits having most significant bits (MSBs) and least significant bits (LSBs), wherein the MSBs are associated with the bandwidth value, and wherein the LSBs are associated with the primary channel ID and the channel ID. The operations may further include determining whether the one or more indications include a first index and a second index, wherein the first index is associated with the bandwidth value and the channel ID, and the second index is associated with the primary channel ID. The operations may further include determining that the EDMG field is associated with an EDMG physical layer convergence protocol data unit (PPDU). The operations may include associating the one or more indications with the bandwidth value and the channel ID.

In example embodiments of the disclosure, there may be an apparatus. The apparatus may include means for encoding, by one or more processors, an extended directional multi-gigabit (EDMG) field with one or more indications of a primary channel ID, a bandwidth value, or a channel ID for transmission over a wireless communication channel associated with the channel ID. The apparatus may include means for causing the EDMG field to be wirelessly transmitted to a first device over the wireless communication channel.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table includes one or more combinations of a primary channel ID, a bandwidth value, or a channel ID. The index is comprised of one or more bits having most significant bits (MSBs) and least significant bits (LSBs), wherein the MSBs are associated with the bandwidth value, and wherein the LSBs are associated with the primary channel ID and the channel ID. The apparatus may further include means for determining whether the one or more indications include a first index and a second index, wherein the first index is associated with the bandwidth value and the channel ID, and the second index is associated with the primary channel ID. The apparatus may further include means for determining that the EDMG field is i associated with an EDMG physical layer convergence protocol data unit (PPDU). The apparatus may include means for associating the one or more indications with the bandwidth value and the channel ID.

In example embodiments of the disclosure, there may be an apparatus. The apparatus may include may include means for identifying an extended directional multi-gigabit (EDMG) field received from a device on a wireless communication channel. The apparatus may include means for identifying one or more indications associated with at least one of a primary channel ID, a bandwidth value, or a channel ID. The apparatus may include means for causing to send one or more frames to the device based at least in part on the one or more indications.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table includes one or more combinations of a primary channel ID, a bandwidth value, or a channel ID. The index is comprised of one or more bits having most significant bits (MSBs) and least significant bits (LSBs).

According to example embodiments of the disclosure, there may include a method. The method may include encoding, by one or more processors, an extended directional multi-gigabit (EDMG) field with one or more indications of a primary channel ID, a bandwidth value, or a channel ID for transmission over a wireless communication channel associated with the channel ID. The method may include causing the EDMG field to be wirelessly transmitted to a first device over the wireless communication channel.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table includes one or more combinations of a primary channel ID, a bandwidth value, or a channel ID. The index is comprised of one or more bits having most significant bits (MSBs) and least significant bits (LSBs), wherein the MSBs are associated with the bandwidth value, and wherein the LSBs are associated with the primary channel ID and the channel ID. The method may further include determining whether the one or more indications include a first index and a second index, wherein the first index is associated with the bandwidth value and the channel ID, and the second index is associated with the primary channel ID. The method may further include determining that the EDMG field is associated with an EDMG physical layer convergence protocol data unit (PPDU). The method may further include associating the one or more indications with the bandwidth value and the channel ID. The primary channel ID is associated with at least one of an in-band primary channel or an out-band primary channel.

According to example embodiments of the disclosure, there may include a method. The method may include identifying an extended directional multi-gigabit (EDMG) field received from a device on a wireless communication channel. The method may include identifying one or more indications associated with at least one of a primary channel ID, a bandwidth value, or a channel ID. The method may include causing to send one or more frames to the device based at least in part on the one or more indications.

The implementations may include one or more of the following features. The wireless communication channel is at least one of a 2.16 GHz, a 4.32 GHz, a 6.48 GHz, a 8.64 GHz, or a 2.16 GHz+2.16 GHz channel. The wireless communication channel is comprised of one or more aggregated adjacent channels. Each one of the one or more indications is an index to an entry in a table, wherein the table includes one or more combinations of a primary channel ID, a bandwidth value, or a channel ID. The index is comprised of one or more bits having most significant bits (MSBs) and least significant bits (LSBs).

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for transmitting an enhanced directional multi-gigabit (EDMG) frame using a communication bandwidth, the device comprising processing circuitry coupled to storage, the processing circuitry configured to:
    determine a primary channel associated with one or more wireless communication bandwidths, wherein a first wireless communication bandwidth of the one or more wireless communication bandwidths is 2.16 GHz that is at least one of a first 2.16 GHz bandwidth, a second 2.16 GHz bandwidth, a third 2.16 GHz bandwidth, a fourth 2.16 GHz bandwidth, a fifth 2.16 GHz bandwidth, and a sixth 2.16 GHz bandwidth, and wherein a second wireless communication bandwidth of the one or more wireless communication bandwidths is 4.32 GHz that is at least one of the first 2.16 GHz bandwidth added to the second 2.16 GHz bandwidth, the second 2.16 GHz bandwidth added to the third 2.16 GHz bandwidth, the third 2.16 GHz bandwidth added to the fourth 2.16 GHz bandwidth, the fourth 2.16 GHz bandwidth added to the fifth 2.16 GHz bandwidth, and the fifth 2.16 GHz bandwidth added to the sixth 2.16 GHz bandwidth;
    determine a secondary channel associated with the wireless communication bandwidth, wherein the secondary channel is allocated for a transmission over the wireless communication bandwidth;
    encode an enhanced directional multi-gigabit (EDMG) field with a first index of a table, wherein the first index is associated with a primary channel ID of the primary channel, a first bandwidth value, and a first channel ID of the secondary channel, and wherein the primary channel ID indicates a location of the primary channel within the wireless communication bandwidth, wherein the wireless communication bandwidth is comprised of one or more aggregated channels;

generate an EDMG frame comprising the EDMG field, wherein the EDMG field is included in any EDMG frame; and based on the encoded EDMG field, cause to send the EDMG frame to the first device.

2. The device of claim 1, wherein the wireless communication bandwidth is at least one of a 2.16 GHz, a 4.32 GHz, a 6.48 GHz, a 8.64 GHz, or a 2.16 GHz+2.16 GHz channel.

3. The device of claim 1, wherein the wireless communication bandwidth is comprised of one or more aggregated adjacent channels.

4. The device of claim 1, wherein each one of the one or more indications is an index to an entry in a table, wherein the table includes one or more combinations of a primary channel ID, a bandwidth value, and a channel ID.

5. The device of claim 4, wherein the index is associated with of one or more bits having most significant bits (MSBs) and least significant bits (LSBs).

6. The device of claim 1, wherein the memory and the processing circuitry are further configured to determine whether the one or more indications include a first index and a second index, wherein the first index is associated with the bandwidth value and the channel ID, and the second index is associated with the primary channel ID.

7. The device of claim 1, wherein the memory and the processing circuitry are further configured to determine that the EDMG field is associated with an EDMG physical layer convergence protocol data unit (PPDU).

8. The device of claim 1, further comprising a transceiver configured to transmit and receive wireless signals.

9. The device of claim 8, further comprising an antenna coupled to the transceiver to cause to send the EDMG field.

10. A non-transitory computer-readable medium storing computer-executable instructions for transmitting an enhanced directional multi-gigabit (EDMG) frame using a communication bandwidth which when executed by one or more processors result in performing operations comprising:

determining a primary channel associated with one or more wireless communication bandwidths, wherein a first wireless communication bandwidth of the one or more wireless communication bandwidths is 2.16 GHz that is at least one of a first 2.16 GHz bandwidth, a second 2.16 GHz bandwidth, a third 2.16 GHz bandwidth, a fourth 2.16 GHz bandwidth, a fifth 2.16 GHz bandwidth, and a sixth 2.16 GHz bandwidth, and wherein a second wireless communication bandwidth is 4.32 GHz that is at least one of the first 2.16 GHz bandwidth added to the second 2.16 GHz bandwidth, the second 2.16 GHz bandwidth added to the third 2.16 GHz bandwidth, the third 2.16 GHz bandwidth added to the fourth 2.16 GHz bandwidth, the fourth 2.16 GHz bandwidth added to the fifth 2.16 GHz bandwidth, and the fifth 2.16 GHz bandwidth added to the sixth 2.16 GHz bandwidth;

determining a secondary channel associated with the wireless communication bandwidth, wherein the secondary channel is allocated for a transmission over the wireless communication bandwidth;

encoding an enhanced directional multi-gigabit (EDMG) field with a first index of a table, wherein the first index is associated with a primary channel ID of the primary channel, a first bandwidth value, and a first channel ID of the secondary channel, and wherein the primary channel ID indicates a location of the primary channel within the wireless communication bandwidth, wherein the wireless communication bandwidth is comprised of one or more aggregated channels;

generating an EDMG frame comprising the EDMG field, wherein the EDMG field is included in any EDMG frame; and based on the encoded EDMG field, causing to send the EDMG frame to the first device.

11. The non-transitory computer-readable medium of claim 10, wherein the wireless communication bandwidth is at least one of a 2.16 GHz, a 4.32 GHz, a 6.48 GHz, a 8.64 GHz, or a 2.16 GHz+2.16 GHz channel.

12. The non-transitory computer-readable medium of claim 10, wherein the wireless communication bandwidth is comprised of one or more aggregated adjacent channels.

13. The non-transitory computer-readable medium of claim 10, wherein each one of the one or more indications is an index to an entry in a table, wherein the table includes one or more combinations of a primary channel ID, a bandwidth value, and a channel ID.

14. The non-transitory computer-readable medium of claim 13, wherein the index is associated with of one or more bits having most significant bits (MSBs) and least significant bits (LSBs).

15. The non-transitory computer-readable medium of claim 10, wherein the memory and the processing circuitry are further configured to determine whether the one or more indications include a first index and a second index, wherein the first index is associated with the bandwidth value and the channel ID, and the second index is associated with the primary channel ID.

16. The non-transitory computer-readable medium of claim 10, wherein the memory and the processing circuitry are further configured to determine that the EDMG field is associated with an EDMG physical layer convergence protocol data unit (PPDU).

17. A method for transmitting an enhanced directional multi-gigabit (EDMG) frame using a communication bandwidth, the method comprising:

determining a primary channel associated with one or more wireless communication bandwidths, wherein a first wireless communication bandwidth of the one or more wireless communication bandwidths is 2.16 GHz that is at least one of a first 2.16 GHz bandwidth, a second 2.16 GHz bandwidth, a third 2.16 GHz bandwidth, a fourth 2.16 GHz bandwidth, a fifth 2.16 GHz bandwidth, and a sixth 2.16 GHz bandwidth, and wherein a second wireless communication bandwidth of the one or more wireless communication bandwidths is 4.32 GHz that is at least one of the first 2.16 GHz bandwidth added to the second 2.16 GHz bandwidth, the second 2.16 GHz bandwidth added to the third 2.16 GHz bandwidth, the third 2.16 GHz bandwidth added to the fourth 2.16 GHz bandwidth, the fourth 2.16 GHz bandwidth added to the fifth 2.16 GHz bandwidth, and the fifth 2.16 GHz bandwidth added to the sixth 2.16 GHz bandwidth;

determining a secondary channel associated with the wireless communication bandwidth, wherein the secondary channel is allocated for a transmission over the wireless communication bandwidth;

encoding an enhanced directional multi-gigabit (EDMG) field with a first index of a table, wherein the first index is associated with a primary channel ID of the primary channel, a first bandwidth value, and a first channel ID of the secondary channel, and wherein the primary channel ID indicates a location of the primary channel within the wireless communication bandwidth, wherein the wireless communication bandwidth is comprised of one or more aggregated channels;

generating an EDMG frame comprising the EDMG field, wherein the EDMG field is included in any EDMG frame; and based on the encoded EDMG field, causing to send the EDMG frame to the first device.

18. The method of claim 17, wherein the wireless communication bandwidth is at least one of a 2.16 GHz, a 4.32 GHz, a 6.48 GHz, a 8.64 GHz, or a 2.16 GHz+2.16 GHz channel.

19. The method of claim 17, wherein the wireless communication bandwidth is comprised of one or more aggregated adjacent channels.

20. The method of claim 17, wherein each one of the one or more indications is an index to an entry in a table, wherein the table includes one or more combinations of a primary channel ID, a bandwidth value, and a channel ID.

* * * * *